US010938528B2

(12) United States Patent
Liu et al.

(10) Patent No.: US 10,938,528 B2
(45) Date of Patent: Mar. 2, 2021

(54) COMMUNICATION METHOD, BASE STATION, AND TERMINAL DEVICE

(71) Applicant: Huawei Technologies Co., Ltd., Shenzhen (CN)

(72) Inventors: Yifan Liu, Shenzhen (CN); Ming Lei, Shenzhen (CN); Leiming Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/439,187

(22) Filed: Jun. 12, 2019

(65) Prior Publication Data

US 2019/0363839 A1 Nov. 28, 2019

Related U.S. Application Data

(63) Continuation of application No. PCT/CN2017/115429, filed on Dec. 11, 2017.

(30) Foreign Application Priority Data

Dec. 15, 2016 (CN) .......................... 201611157801.4

(51) Int. Cl.
*H04L 5/00* (2006.01)
*H04W 4/70* (2018.01)
(Continued)

(52) U.S. Cl.
CPC .......... *H04L 5/0044* (2013.01); *H04L 1/0071* (2013.01); *H04L 1/1861* (2013.01); *H04W 4/70* (2018.02); *H04W 72/0466* (2013.01)

(58) Field of Classification Search
CPC ... H04L 1/1861; H04L 1/0071; H04L 5/0073; H04L 5/0007; H04L 5/0044; H04W 4/70;
(Continued)

(56) References Cited

U.S. PATENT DOCUMENTS 9,185,701 B2 * 11/2015 Seo .................. H04L 5/0028
9,391,752 B2 * 7/2016 Shimezawa ......... H04W 72/042
(Continued)

FOREIGN PATENT DOCUMENTS

CN 101299745 A 11/2008
CN 101384093 A 3/2009
(Continued)

OTHER PUBLICATIONS

"3rd Generation Partnership Project; Technical Specification Group Radio Access Network; Evolved Universal Terrestrial Radio Access (E-UTRA); Multiplexing and channel coding (Release 14)," 3GPP TS 36.212 V14.0.0, 3GPP—3rd Generation Partnership Project—Valbonne, France (Sep. 2016).
(Continued)

*Primary Examiner* — Tejis Daya
(74) *Attorney, Agent, or Firm* — Leydig, Voit & Mayer, Ltd.

(57) ABSTRACT

Embodiments of this application provide a communication method, a base station, and a terminal device. The communication method includes: determining, by a base station, a resource mapping manner of data to be sent to a terminal device, where the resource mapping manner is one or more of a resource mapping manner in time domain first then frequency domain, a resource mapping manner in frequency domain first then time domain, and a resource mapping manner with interleaved mapping in at least one of time or frequency domain; and sending, by the base station, indication information to the terminal device, where the indication information indicates the resource mapping manner. According to the embodiments of this application, the resource mapping manner of the data can be flexibly configured, thereby dispersing interference as much as possible and improving a rate of correct decoding.

14 Claims, 6 Drawing Sheets

(51) Int. Cl.
*H04L 1/00* (2006.01)
*H04L 1/18* (2006.01)
*H04W 72/04* (2009.01)

(58) Field of Classification Search
CPC ............. H04W 72/0466; H04W 72/04; H04W 72/042
See application file for complete search history.

(56) References Cited

U.S. PATENT DOCUMENTS

| | | | |
|---|---|---|---|
| 2010/0157927 A1* | 6/2010 | Mochizuki .......... | H04L 27/0006 370/329 |
| 2011/0026631 A1* | 2/2011 | Zhang .................. | H04B 7/0613 375/267 |
| 2013/0346827 A1* | 12/2013 | Kim .................. | H03M 13/6525 714/762 |
| 2014/0119336 A1* | 5/2014 | Liu ....................... | H04L 5/0053 370/330 |
| 2014/0286281 A1* | 9/2014 | Jang ..................... | H04L 5/0092 370/329 |
| 2015/0131554 A1* | 5/2015 | Jiang .................. | H04W 72/042 370/329 |
| 2017/0142593 A1* | 5/2017 | Seo ....................... | H04L 5/001 |
| 2017/0338906 A1* | 11/2017 | Peng .................... | H04L 1/0071 |
| 2018/0034596 A1* | 2/2018 | Noh ...................... | H04L 1/1812 |
| 2019/0037540 A1* | 1/2019 | Seo ...................... | H04W 72/042 |
| 2019/0229863 A1* | 7/2019 | Lei ....................... | H04L 5/0014 |

FOREIGN PATENT DOCUMENTS

| | | |
|---|---|---|
| CN | 102082600 A | 6/2011 |
| CN | 103391619 A | 11/2013 |
| CN | 105656596 A | 6/2016 |
| EP | 3166249 A1 | 5/2017 |
| EP | 17880695 | 9/2020 |
| WO | 2013058599 A1 | 4/2013 |
| WO | 2014015800 A1 | 1/2014 |
| WO | 2016003229 A1 | 1/2016 |

OTHER PUBLICATIONS

"Channel interleaver for UL OFDM," 3GPP TSG RAN WG1 Meeting #55bis, Ljubljana, R1-090258, XP050318185, pp. 1-3, 3rd Generation Partnership Project, Valbonne, France (Jan. 12-16, 2009).

"Discussion on short processing delay," 3GPP TSG RAN WG1 Meeting #86bis, Lisbon, Portugal, R1-1609431, pp. 1-3, 3rd Generation Partnership Project, Valbonne, France (Oct. 10-14, 2016).

Dahlman et al., "Downlink Physical-Layer Processing-Chapter 10", 4G LTE/LTE—Advanced for Mobile Broadband, XP055249210, pp. 161-240, Elsevier Ltd. Amsterdam, Netherlands (Mar. 2011).

"Discussion on outer coding on eMBB data," 3GPP TSG RAN WG1 Meeting #86, Gothenburg, Sweden, R1-166898, pp. 1-5, 3rd Generation Partnership Project, Valbonne, France (Aug. 22-26, 2016).

"3rd Generation Partnership Project; Technical Specification Group Radio Access Network; Evolved Universal Terrestrial Radio Access (E-UTRA); Physical channels and modulation (Release 14)," 3GPP TS 36.211 V14.0.0, pp. 1-170, 3rd Generation Partnership Project, Valbonne, France (Sep. 2016).

"3rd Generation Partnership Project; Technical Specification Group Radio Access Network; Evolved Universal Terrestrial Radio Access (E-UTRA); Physical layer procedures (Release 14)," 3GPP TS 36.213 V14.0.0, pp. 1-406, 3rd Generation Partnership Project, Valbonne, France (Sep. 2016).

* cited by examiner

COMMUNICATION METHOD, BASE STATION, AND TERMINAL DEVICE

CROSS-REFERENCE TO RELATED APPLICATIONS

This application is a continuation of an International Application No. PCT/CN2017/115429, filed on Dec. 11, 2017, which claims priority to Chinese Patent Application No. 201611157801.4, filed on Dec. 15, 2016, the disclosure of which is hereby incorporated by reference in its entirety.

TECHNICAL FIELD

This application relates to the communications field, and in particular, to a communication method, a base station, and a terminal device.

BACKGROUND

In a Long Term Evolution (LTE) system, resource mapping of all data is performed in frequency domain first then time domain. Data on one code block (CB) is all mapped to a limited quantity of symbols (for example, one or two symbols). In a low-load scenario, a reference signal from a neighboring cell is a main interference source. A channel state information-reference signal (CSI-RS) is used as an example. FIG. 1 shows distribution of CBs of user data. One grid in the lateral axis represents one orthogonal frequency division multiplexing (OFDM) symbol, and one grid in the longitudinal axis represents one subcarrier. To describe a problem more intuitively, in FIG. 1, one CB exactly occupies one OFDM symbol. However, an actual case may not be limited thereto. The first and the second symbols are for a control channel, and the third to the fourteenth symbols are for a shared data channel. It can be learned from FIG. 1 that, interference sources, namely, CSI-RSs, are concentrated on a CB 4 and a CB 5. When a channel coding rate is relatively high, error correction of the CB 4 and the CB 5 is very difficult to be implemented through channel decoding. Although other CBs are not interfered and can be correctly decoded, whether a transport block (TB) is correctly decoded depends on whether all CBs included in the TB are correctly decoded. Therefore, when the interference is concentrated on several CBs, it is very hard for the interfered CBs to be correctly decoded. This leads to wrong decoding of a TB to which the CBs belong.

SUMMARY

Embodiments of this application provide a communication method, a base station, and a terminal device, to improve a rate of correct decoding.

According to a first aspect, a communication method is provided. The method includes:

determining, by a base station, a resource mapping manner of data to be sent to a terminal device, where the resource mapping manner is one or more of a resource mapping manner in time domain first then frequency domain, a resource mapping manner in frequency domain first then time domain, and a resource mapping manner with interleaved mapping in time and/or frequency domain; and sending, by the base station, indication information to the terminal device, where the indication information indicates the resource mapping manner.

According to this embodiment of this application, the resource mapping manner of the data can be flexibly configured, thereby dispersing interference and improving a rate of correct decoding.

In some possible implementations, the determining, by a base station, a resource mapping manner of data includes:

determining, by the base station, the resource mapping manner of the data based on at least one of a service type of the data to be sent to the terminal device, a size of a resource block occupied by the data, and a distribution status of interference on the data.

The resource mapping manner of the data is determined based on at least one of the service type of the data to be sent to the terminal device, the size of the resource block occupied by the data, and the distribution status of the interference on the data.

In some possible implementations, determining, by the base station, the resource mapping manner of the data based on the service type of the data includes:

determining, by the base station, that the resource mapping manner is a resource mapping manner in frequency domain first then time domain when the data belongs to an ultra-reliable and low latency communications URLLC-type service;

determining, by the base station, that the resource mapping manner is a resource mapping manner in time domain first then frequency domain or a resource mapping manner with interleaved mapping in time and/or frequency domain when the data belongs to an enhanced mobile broadband eMBB-type service; or determining, by the base station, that the resource mapping manner is a resource mapping manner in frequency domain first then time domain, a resource mapping manner in time domain first then frequency domain, or a resource mapping manner with interleaved mapping in time and/or frequency domain when the data belongs to a massive machine type communications mMTC-type service.

According to this embodiment of this application, the resource mapping manner of the data is determined based on the service type of the to-be-sent data, thereby satisfying a QoS requirement of a service.

In some possible implementations, determining, by the base station, the resource mapping manner of the data based on the size of the resource block occupied by the data includes:

determining, by the base station, that the resource mapping manner is a resource mapping manner in time domain first then frequency domain or a resource mapping manner with interleaved mapping in time and/or frequency domain if the size of the resource block occupied by the data is greater than or equal to a specified first threshold; or determining, by the base station, that the resource mapping manner is a resource mapping manner in frequency domain first then time domain if the size of the resource block occupied by the data is less than or equal to a specified second threshold.

The first threshold may be greater than or equal to the second threshold.

According to this embodiment of this application, the resource mapping manner of the data is determined based on the size of the resource block occupied by the to-be-sent data, so that the interference can be dispersed as much as possible, thereby improving the rate of correct decoding.

In some possible implementations, determining, by the base station, the resource mapping manner of the data based on the distribution status of the interference on the data includes:

determining, by the base station, that the resource mapping manner is a resource mapping manner in time domain first then frequency domain or a resource mapping manner with interleaved mapping in time and/or frequency domain if a distribution density of the interference on the data in frequency domain is greater than a distribution density of the interference on the data in time domain; or determining, by the base station, that the resource mapping manner is a resource mapping manner in frequency domain first then time domain if a distribution density of the interference on the data in frequency domain is less than a distribution density of the interference on the data in time domain.

According to this embodiment of this application, the resource mapping manner of the data is determined based on the distribution status of the interference on the to-be-sent data, so that the interference can be dispersed as much as possible, thereby improving the rate of correct decoding.

In some possible implementations, the sending, by the base station, indication information to the terminal device includes:

sending, by the base station, physical layer signaling to the terminal device, where the physical layer signaling includes the indication information.

Optionally, the indication information may explicitly or implicitly indicate the resource mapping manner. For example, the indication information is identification information of the resource mapping manner; or the indication information is identification information of at least one of the service type of the data, the size of the resource block occupied by the data, and the distribution status of the interference on the data.

In some possible implementations, the resource mapping manner has a correspondence with a scrambling code used by physical layer signaling; and the sending, by the base station, indication information to the terminal device includes:

sending, by the base station, the physical layer signaling to the terminal device, where the scrambling code used by the physical layer signaling indicates the resource mapping manner.

In some possible implementations, the resource mapping manner has a correspondence with a time-frequency resource occupied by the data; and the sending, by the base station, indication information to the terminal device includes:

sending, by the base station, indication information of the time-frequency resource to the terminal device, where the time-frequency resource indicates the resource mapping manner.

According to a second aspect, a communication method is provided. The method includes:

receiving, by a terminal device, indication information from a base station, where the indication information indicates a resource mapping manner of data to be sent by the base station, and the resource mapping manner is one or more of a resource mapping manner in time domain first then frequency domain, a resource mapping manner in frequency domain first then time domain, and a resource mapping manner with interleaved mapping in time and/or frequency domain;

determining, by the terminal device, the resource mapping manner based on the indication information; and receiving, by the terminal device, the data based on the resource mapping manner.

According to this embodiment of this application, the resource mapping manner of the data can be flexibly configured, thereby dispersing interference and improving a rate of correct decoding.

In some possible implementations, the resource mapping manner is determined based on at least one of a service type of the data, a size of a resource block occupied by the data, and a distribution status of interference on the data.

In some possible implementations, when the data belongs to an ultra-reliable and low latency communications URLLC-type service, the determining, by the terminal device, the resource mapping manner based on the indication information includes: determining, by the terminal device, that the resource mapping manner is a resource mapping manner in frequency domain first then time domain based on the indication information;

when the data belongs to an enhanced mobile broadband eMBB-type service, the determining, by the terminal device, the resource mapping manner based on the indication information includes: determining, by the terminal device, that the resource mapping manner is a resource mapping manner in time domain first then frequency domain or a resource mapping manner with interleaved mapping in time and/or frequency domain based on the indication information; or when the data belongs to a massive machine type communications mMTC-type service, the determining, by the terminal device, the resource mapping manner based on the indication information includes: determining, by the terminal device, that the resource mapping manner is a resource mapping manner in time domain first then frequency domain, a resource mapping manner in frequency domain first then time domain, or a resource mapping manner with interleaved mapping in time and/or frequency domain based on the indication information.

According to this embodiment of this application, the resource mapping manner of the data is determined based on the service type of the to-be-sent data, thereby satisfying a QoS requirement of a service.

In some possible implementations, if the size of the resource block occupied by the data is greater than or equal to a specified first threshold, the determining, by the terminal device, the resource mapping manner based on the indication information includes: determining, by the terminal device, that the resource mapping manner is a resource mapping manner in time domain first then frequency domain or a resource mapping manner with interleaved mapping in time and/or frequency domain based on the indication information; or if the size of the resource block occupied by the data is less than or equal to a specified second threshold, the determining, by the terminal device, the resource mapping manner based on the indication information includes: determining, by the terminal, that the resource mapping manner is a resource mapping manner in frequency domain first then time domain based on the indication information.

According to this embodiment of this application, the resource mapping manner of the data is determined based on the size of the resource block occupied by the to-be-sent data, so that the interference can be dispersed as much as possible, thereby improving the rate of correct decoding.

In some possible implementations, if a distribution density of the interference on the data in frequency domain is greater than a distribution density of the interference on the data in time domain, the determining, by the terminal device, the resource mapping manner based on the indication information includes: determining, by the terminal, that the resource mapping manner is a resource mapping manner in time domain first then frequency domain or a resource mapping manner with interleaved mapping in time and/or frequency domain based on the indication information; or if a distribution density of the interference on the data in frequency domain is less than a distribution density of the interference on the data in time domain, the determining, by the terminal device, the resource mapping manner based on the indication information includes: determining, by the terminal, that the resource mapping manner is a resource mapping manner in frequency domain first then time domain based on the indication information.

According to this embodiment of this application, the resource mapping manner of the data is determined based on the distribution status of the interference on the to-be-sent data, so that the interference can be dispersed as much as possible, thereby improving the rate of correct decoding.

In some possible implementations, the receiving, by a terminal device, indication information from a base station includes:

receiving, by the terminal device, physical layer signaling from the base station, where the physical layer signaling includes the indication information.

Optionally, the indication information may explicitly or implicitly indicate the resource mapping manner. For example, the indication information is identification information of the resource mapping manner; or the indication information is identification information of at least one of the service type of the data, the size of the resource block occupied by the data, and the distribution status of the interference on the data.

In some possible implementations, the resource mapping manner has a correspondence with a scrambling code used by physical layer signaling; and the receiving, by a terminal device, indication information from a base station includes:

receiving, by the terminal device, the physical layer signaling from the base station, where the scrambling code used by the physical layer signaling indicates the resource mapping manner.

In some possible implementations, the resource mapping manner has a correspondence with a time-frequency resource occupied by the data; and the receiving, by a terminal device, indication information from a base station includes:

receiving, by the terminal device, indication information of the time-frequency resource from the base station, where the time-frequency resource indicates the resource mapping manner.

According to a third aspect, a base station is provided. The base station is configured to implement the method according to any one of the first aspect or the foregoing possible implementation of the first aspect.

Specifically, the base station may include units configured to perform the method according to any one of the first aspect or the possible implementation of the first aspect.

According to a fourth aspect, a terminal device is provided. The terminal device is configured to implement the method according to any one of the second aspect or the foregoing possible implementation of the second aspect.

Specifically, the terminal device may include units configured to perform the method according to any one of the second aspect or the possible implementation of the second aspect.

According to a fifth aspect, a base station is provided. The base station includes: a processor, a transmitter, and a memory. The processor, the transmitter, and the memory communicate with each other via an internal connection path. The memory is configured to store an instruction. The processor is configured to execute the instruction stored in the memory. The execution of the instruction stored in the memory enables the base station to perform the method according to any one of the first aspect or the possible implementation of the first aspect.

According to a sixth aspect, a terminal device is provided. The terminal device includes: a processor, a receiver, a memory, and a bus system. The processor, the receiver, and the memory communicate with each other via an internal connection path. The memory is configured to store an instruction. The processor is configured to execute the instruction stored in the memory. The execution of the instruction stored in the memory enables the terminal device to perform the method according to any one of the second aspect or the possible implementation of the second aspect.

According to a seventh aspect, a computer-readable storage medium is provided. The computer-readable storage medium stores a program, and the program enables a base station to perform the method according to any one of the first aspect or the possible implementation of the first aspect.

According to an eighth aspect, a computer-readable storage medium is provided. The computer-readable storage medium stores a program, and the program enables a terminal device to perform the method according to any one of the second aspect or the possible implementation of the second aspect.

DESCRIPTION OF EMBODIMENTS

The following describes the technical solutions in the embodiments of this application with reference to the accompanying drawings in the embodiments of this application.

It should be understood that, the technical solutions of the embodiments of this application may be applied to various communications systems, for example, a wireless fidelity (Wi-Fi) system, a Worldwide Interoperability for Microwave Access (WiMAX) system, a Global system for Mobile Communications (GSM) system, a Code Division Multiple Access (CDMA) system, a Wideband Code Division Multiple Access (WCDMA) system, a general packet radio service (GPRS) system, a Long Term Evolution (LTE) system, a Long Term Evolution Advanced (LTE-A) system, a Universal Mobile Telecommunication System (UMTS) system, and a $3^{rd}$ Generation Partnership Project (3GPP)-related cellular system. This is not limited in the embodiments of this application. However, for ease of description, in the embodiments of this application, an LTE network is used as an example for description.

The embodiments of this application may be applied to radio networks with different standards. A radio access network may include different network elements in different systems. For example, a network element in a radio access network in a 5G network includes a gNB. Network elements in radio access networks in Long Term Evolution (LTE) and LTE-A include an evolved NodeB (eNodeB, eNB), and a network element in a radio access network in Wideband Code Division Multiple Access (WCDMA) includes a radio network controller (RNC) and a NodeB. Similarly, a solution similar to that in the embodiments of this application may also be used in another radio network in Worldwide Interoperability for Microwave Access (WiMAX) and the like, and only related modules in a base station system may be different. This is not limited in the embodiments of this application. However, for ease of description, in the following embodiments, a base station is used as an example for description.

It should also be understood that in the embodiments of this application, a terminal device may also be referred to as user equipment (UE), a mobile station (MS), a mobile terminal, and the like. The terminal device may communicate with one or more core networks through a radio access network (RAN). For example, the terminal device may be a mobile phone (or referred to as a "cellular" phone), or a computer having a communication function; for example, the terminal device may alternatively be a portable, pocket-sized, handheld, computer built-in, or in-vehicle mobile apparatus.

"First" and "second" in the embodiments of this application are only for distinguishing and do not indicate a sequence or magnitude.

Figure 2:
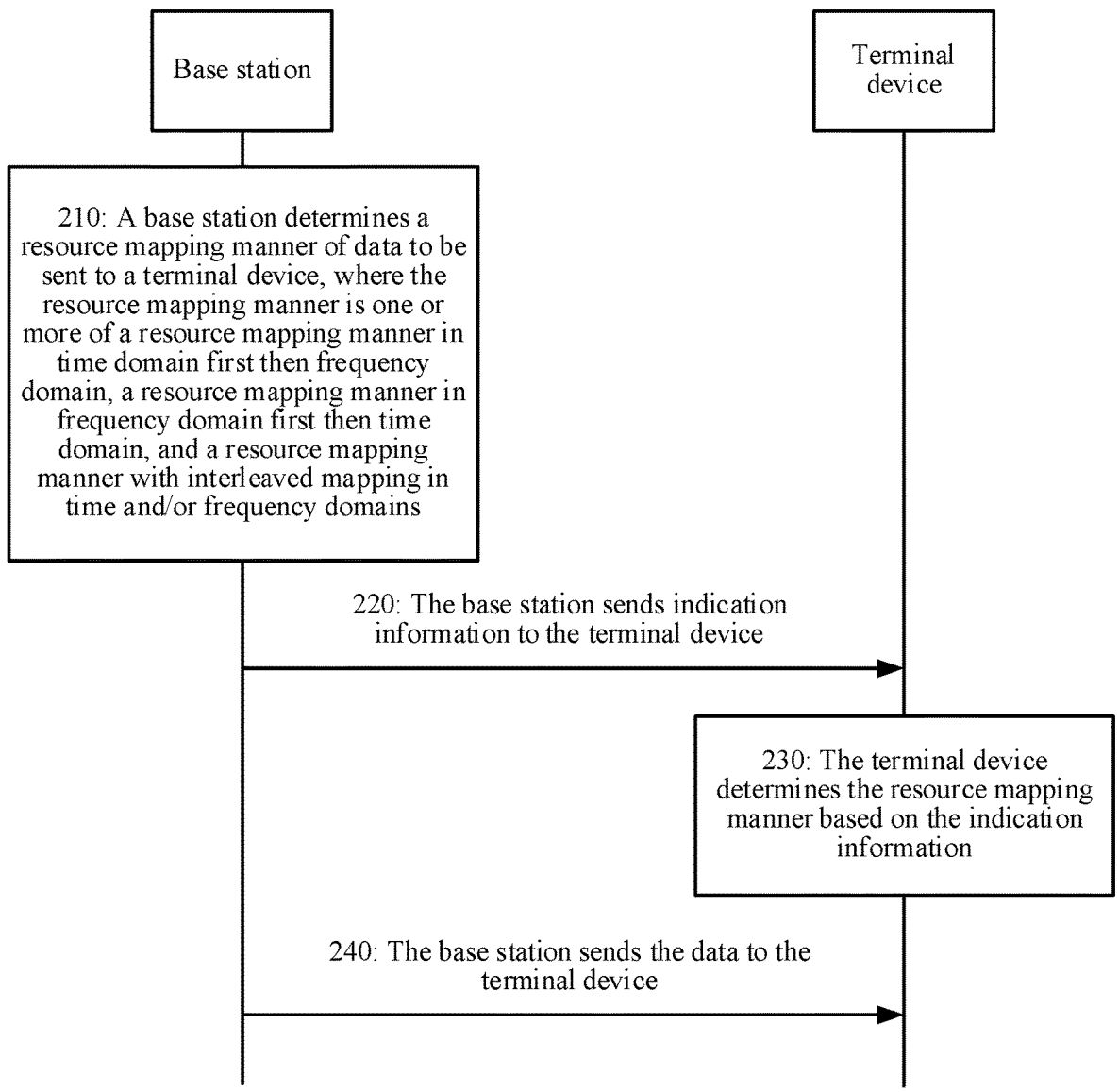
FIG. 2 is a schematic flowchart of a communication method according to an embodiment of this application.

FIG. 2 is a schematic flowchart of a communication method according to an embodiment of this application. As shown in FIG. 2, a method 200 includes the following content.

210: A base station determines a resource mapping manner of data to be sent to a terminal device, where the resource mapping manner is one or more of a resource mapping manner in time domain first then frequency domain, a resource mapping manner in frequency domain first then time domain, and a resource mapping manner with interleaved mapping in time and/or frequency domain.

Figure 1:
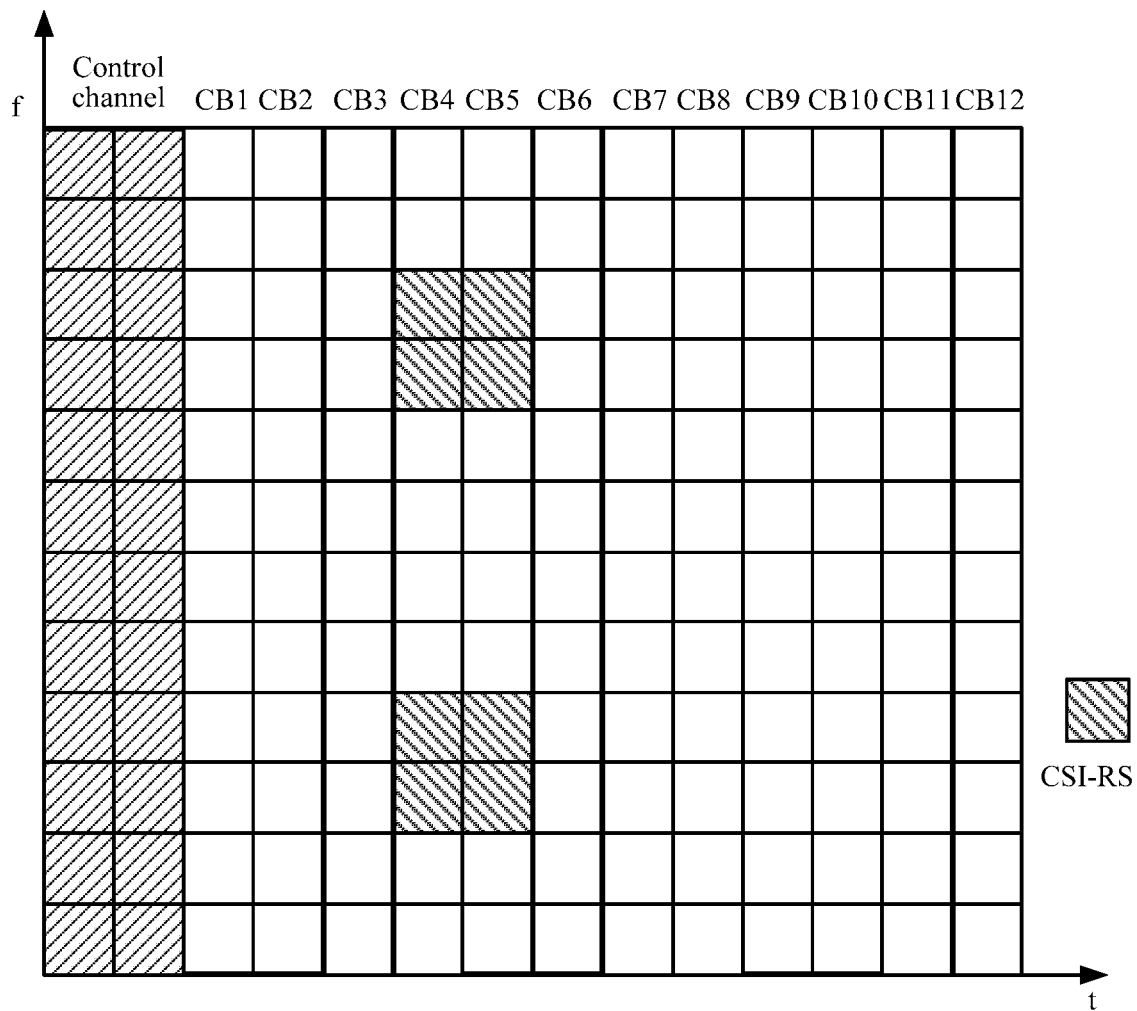
FIG. 1 is a schematic diagram of a resource mapping manner in frequency domain first then time domain.

For the resource mapping manner in frequency domain first then time domain, refer to FIG. 1 in which one CB occupies one OFDM symbol. It should be noted that, in FIG. 1, only the example in which one CB occupies one OFDM symbol is used. However, this is not limited in this embodiment of this application. A detection latency can be reduced in the resource mapping manner in frequency domain first then time domain. Therefore, the resource mapping manner in frequency domain first then time domain is applicable to a low-latency service.

Figure 3:
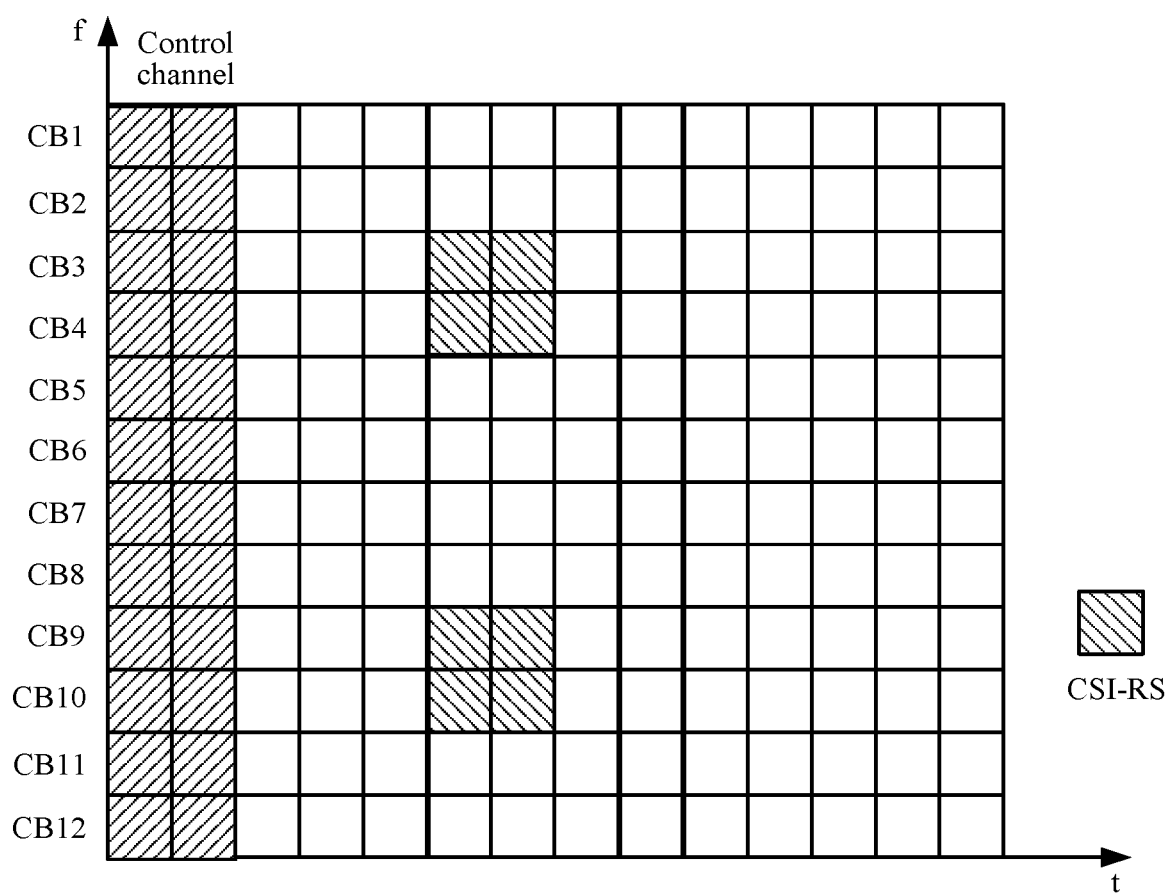
FIG. 3 is a schematic diagram of a resource mapping manner in time domain first then frequency domain.

For the resource mapping manner in frequency domain first then time domain, refer to FIG. 3. One grid in the lateral axis in FIG. 3 represents one OFDM symbol, one grid in the longitudinal axis represents one subcarrier, and one CB occupies one subcarrier. It should be noted that, only the example in which one CB occupies one subcarrier is used in FIG. 3. However, this is not limited in this embodiment of this application. In FIG. 3, the first and the second symbols are for a control channel, and the third to the fourteenth symbols are for a shared data channel. In the resource mapping manner in time domain first then frequency domain, CSI-RSs in a neighboring cell fall on four CBs, namely, a CB 3, a CB 4, a CB 9 and a CB 10, while CSI-RSs in a neighboring cell in FIG. 1 fall on two CBs, namely, a CB 4 and a CB 5. Apparently, compared with the resource mapping manner in frequency domain first then time domain, interference can be dispersed in the resource mapping manner in time domain first then frequency domain.

Figure 4:
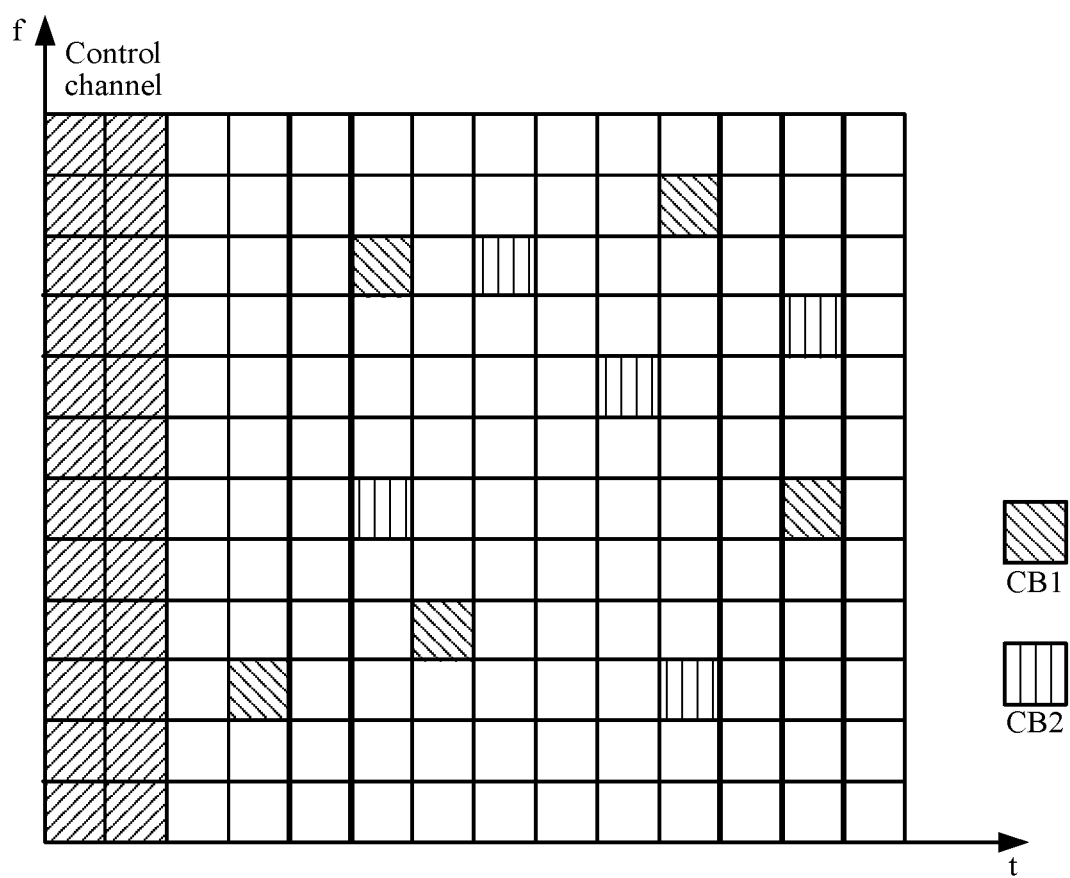
FIG. 4 is a schematic diagram of a resource mapping manner with interleaved mapping in time and/or frequency domain.

For the resource mapping manner with interleaved mapping in time and/or frequency domain, refer to FIG. 4. One grid in the lateral axis in FIG. 4 represents one OFDM symbol, one grid in the longitudinal axis represents one subcarrier, and one CB occupies one subcarrier. As shown in FIG. 4, after data is mapped to resource blocks in the resource mapping manner with interleaved mapping in time and/or frequency domain, compared with the resource mapping manner in frequency domain first then time domain or in time domain first then frequency domain, the data is dispersedly distributed on a time-frequency resource in the resource mapping manner with interleaved mapping in time and/or frequency domain. Therefore, interference can also be dispersed in the resource mapping manner with interleaved mapping in time and/or frequency domain. For example, for the resource mapping manner with interleaved mapping in time and/or frequency domain, refer to an interleaving manner in Table 5.1.3-3 of the protocol TS36.212.

220: The base station sends indication information to the terminal device, where the indication information indicates the resource mapping manner.

230: The terminal device determines the resource mapping manner based on the indication information after receiving the indication information from the base station.

240: The base station sends the data to the terminal device based on the resource mapping manner, and the terminal device receives the data from the base station based on the resource mapping manner.

The terminal device may detect data based on the resource mapping manner, until receiving the data sent by the base station.

Therefore, according to this embodiment of this application, the resource mapping manner of the data can be flexibly configured, thereby dispersing interference as much as possible and improving a rate of correct decoding.

In some embodiments, if the resource mapping manner determined by the base station is more than one of a resource mapping manner in time domain first then frequency domain, a resource mapping manner in frequency domain first then time domain, and a resource mapping manner with interleaved mapping in time and/or frequency domain, the base station may classify the data to be sent to the terminal device into a plurality of groups, and each group of data corresponds to one resource mapping manner. In step 240, the base station may send the plurality of groups of data to the terminal device based on the plurality of resource mapping manners. It should be understood that, the base station may further send grouping information of the data to be sent to the terminal device and a correspondence between the data groups and the resource mapping manners to the terminal device. Alternatively, the grouping information and the correspondence may be pre-stored in the terminal device.

In some embodiments, alternatively, if the resource mapping manner determined by the base station is more than one of a resource mapping manner in time domain first then frequency domain, a resource mapping manner in frequency domain first then time domain, and a resource mapping manner with interleaved mapping in time and/or frequency domain, the base station may send the data based on a resource mapping manner whose priority is the highest. Correspondingly, the terminal device may select the resource mapping manner whose priority is the highest to receive the data. It should be understood that, the terminal device and the base station may pre-agree upon priorities of the resource mapping manner in time domain first then frequency domain, the resource mapping manner in frequency domain first then time domain, and the resource mapping manner with interleaved mapping in time and/or frequency domain.

Optionally, in step 210, the determining, by a base station, a resource mapping manner of data includes: determining, by the base station, the resource mapping manner of the data based on at least one of a service type of the data to be sent to the terminal device, a size of a resource block occupied by the data, and a distribution status of interference on the data.

Optionally, a correspondence between a resource mapping manner and at least one of the service type of the data, the size of the resource block occupied by the data, and the distribution status of the interference on the data may be pre-stored in the base station. Specifically, the base station may determine the resource mapping manner of the data based on the pre-stored correspondence and at least one of the service type of the data, the size of the resource block occupied by the data, and the distribution status of the interference on the data.

In some embodiments, in step 210, the base station determines the resource mapping manner of the data based on the service type of the data to be sent to the terminal device.

Optionally, in step 210, when the data belongs to an ultra-reliable and low latency communications (URLLC)-type service, the base station determines that the resource mapping manner is a resource mapping manner in frequency domain first then time domain. Correspondingly, in step 230, the terminal device determines that the resource mapping manner is a resource mapping manner in frequency domain first then time domain based on the indication information. The URLLC-type service has a relatively high latency requirement. Therefore, the resource mapping manner in frequency domain first then time domain is used to reduce a data detection latency.

Optionally, in step 210, when the data belongs to an enhanced mobile broadband (eMBB)-type service, the base station determines that the resource mapping manner is a resource mapping manner in time domain first then frequency domain or a resource mapping manner with interleaved mapping in time and/or frequency domain. Correspondingly, in step 230, the terminal device determines that the resource mapping manner is a resource mapping manner in time domain first then frequency domain or a resource mapping manner with interleaved mapping in time and/or frequency domain based on the indication information. A data volume of the eMBB-type service is relatively large and a latency requirement is relatively low. Therefore, the resource mapping manner in time domain first then frequency domain or with interleaved mapping in time and/or frequency domain is used to disperse interference, to reduce impact of over-concentrated interference on data transmission, thereby improving transmission efficiency.

Optionally, in step 210, when the data belongs to a massive machine type communications (mMTC)-type service, the base station determines that the resource mapping manner is a resource mapping manner in frequency domain first then time domain, a resource mapping manner in time domain first then frequency domain, or a resource mapping manner with interleaved mapping in time and/or frequency domain. Correspondingly, in step 230, the terminal device determines that the resource mapping manner is a resource mapping manner in frequency domain first then time domain, a resource mapping manner in time domain first then frequency domain, or a resource mapping manner with interleaved mapping in time and/or frequency domain based on the indication information. A data volume of the mMTC-type service is not large and a latency requirement is relatively low. Therefore, any of the resource mapping manners in frequency domain first then time domain, in time domain first then frequency domain, and with interleaved mapping in time and/or frequency domain may be used.

Specifically, the resource mapping manner of the data may further be determined based on an application scenario of the mMTC-type service. For example, if the application scenario of the mMTC-type service has a relatively high latency requirement, the base station determines that the resource mapping manner is a resource mapping manner in frequency domain first then time domain; if the mMTC-type service has a relatively low latency requirement, the base station determines that the resource mapping manner is a resource mapping manner in time domain first then frequency domain or a resource mapping manner with interleaved mapping in time and/or frequency domain.

It should be noted that, the resource mapping manner of the data may alternatively be determined based on another service type of the data.

Therefore, according to this embodiment of this application, the resource mapping manner of the data is determined based on the service type of the to-be-sent data, thereby satisfying a quality of service (QoS) requirement of a service.

In some embodiments, in step 210, the base station determines the resource mapping manner of the data based on the size of the resource block occupied by the data to be sent to the terminal device.

Optionally, in step 210, the base station determines that the resource mapping manner is a resource mapping manner in time domain first then frequency domain or a resource mapping manner with interleaved mapping in time and/or frequency domain if the size of the resource block occupied by the data is greater than or equal to a specified first threshold. Correspondingly, in step 230, the terminal device determines that the resource mapping manner is a resource mapping manner in time domain first then frequency domain or a resource mapping manner with interleaved mapping in time and/or frequency domain based on the indication information. When the resource block occupied by the data is relatively large, a quantity of CBs included in the resource block may be relatively large. Demodulation performance may be reduced if the interference is concentrated on a limited quantity of CBs. In this case, the interference can be dispersed in the resource mapping manner in time domain first then frequency domain or with interleaved mapping in time and/or frequency domain, to reduce impact of over-concentrated interference on data transmission, thereby improving transmission efficiency.

Optionally, in step 210, the base station determines that the resource mapping manner is a resource mapping manner in frequency domain first then time domain if the size of the resource block occupied by the data is less than or equal to a specified second threshold. Correspondingly, in step 230, the terminal device determines that the resource mapping manner is a resource mapping manner in frequency domain first then time domain based on the indication information. When the resource block occupied by the data is relatively small, a quantity of CBs included in the resource block is relatively small, for example, the resource block includes one CB, and the resource mapping manner of the data has relatively small impact on distribution of the interference. Therefore, the resource mapping manner in frequency domain first then time domain may be used.

It should be understood that, the first threshold may be greater than or equal to the second threshold.

Therefore, according to this embodiment of this application, the resource mapping manner of the data is determined based on the size of the resource block occupied by the to-be-sent data, so that the interference can be dispersed as much as possible, thereby improving the rate of correct decoding.

In some embodiments, in step 210, the base station determines the resource mapping manner of the data based on the distribution status of the interference on the data to be sent to the terminal device.

Optionally, in step 210, the base station determines that the resource mapping manner is a resource mapping manner in time domain first then frequency domain or a resource mapping manner with interleaved mapping in time and/or frequency domain if a distribution density of the interference on the data in frequency domain is greater than a distribution density of the interference on the data in time domain. Correspondingly, in step 230, the terminal device determines that the resource mapping manner is a resource mapping manner in time domain first then frequency domain or a resource mapping manner with interleaved mapping in time and/or frequency domain based on the indication information. If the distribution density of the interference on the data in frequency domain is greater than the distribution density of the interference on the data in time domain, the interference can be dispersed in the resource mapping manner in time domain first then frequency domain or with interleaved mapping in time and/or frequency domain, to reduce impact of over-concentrated interference on transmission, thereby improving transmission efficiency.

Optionally, in step 210, the base station determines that the resource mapping manner is a resource mapping manner in frequency domain first then time domain if a distribution density of the interference on the data infrequency domain is less than a distribution density of the interference on the data in time domain. Correspondingly, in step 230, the terminal device determines that the resource mapping manner is a resource mapping manner in frequency domain first then time domain based on the indication information. If the distribution density of the interference on the data in frequency domain is less than the distribution density of the interference on the data in time domain, the interference can be dispersed in the resource mapping manner in frequency domain first then time domain, to reduce impact of over-concentrated interference on transmission, thereby improving transmission efficiency.

Therefore, according to this embodiment of this application, the resource mapping manner of the data is determined based on the distribution status of the interference on the to-be-sent data, so that the interference can be dispersed as much as possible, thereby improving the rate of correct decoding.

In some embodiments, in step 210, the base station determines the resource mapping manner of the data based on the service type of the data to be sent to the terminal device and the size of the resource block occupied by the data.

Table 1 shows a correspondence between resource mapping manners and different service types of the data and a correspondence between resource mapping manners and sizes of the resource block occupied by the data.

TABLE 1

| Size of a resource block | Service type | | |
| --- | --- | --- | --- |
| | URLLC | eMBB | mMTC |
| Large resource block | Resource mapping manner with interleaved mapping in time and/or frequency domain | Resource mapping manner in time domain first then frequency domain | Resource mapping manner in time domain first then frequency domain |
| Small resource block | Resource mapping manner in frequency domain first then time domain | Resource mapping manner with interleaved mapping in time and/or frequency domain | Resource mapping manner in frequency domain first then time domain |

In some embodiments, in step 210, the base station determines the resource mapping manner of the data based on the service type of the data to be sent to the terminal device and the distribution status of the interference on the data.

Table 2 shows a correspondence between resource mapping manners and different service types of the data and a correspondence between resource mapping manners and distribution statuses of the interference on the data.

TABLE 2

| Interference distribution | Service type | | |
| --- | --- | --- | --- |
| | URLLC | eMBB | mMTC |
| Longitudinal distribution | Resource mapping manner with interleaved mapping in time and/or frequency domain | Resource mapping manner in time domain first then frequency domain | Resource mapping manner in time domain first then frequency domain |
| Lateral distribution | Resource mapping manner in frequency domain first then time domain | Resource mapping manner with interleaved mapping in time and/or frequency domain | Resource mapping manner in frequency domain first then time domain |

In some embodiments, in step 210, the base station determines the resource mapping manner of the data based on the size of the resource block occupied by the data to be sent to the terminal device and the distribution status of the interference on the data.

Table 3 shows a correspondence between resource mapping manners and sizes of the resource block occupied by the data and a correspondence between resource mapping manners and distribution statuses of the interference on the data.

TABLE 3

| Size of a resource block | Interference status | |
|---|---|---|
| | Lateral | Longitudinal |
| Large resource block | Resource mapping manner with interleaved mapping in time and/or frequency domain | Resource mapping manner in time domain first then frequency domain |
| Small resource block | Resource mapping manner in frequency domain first then time domain | Resource mapping manner with interleaved mapping in time and/or frequency domain |

In some embodiments, in step 210, the base station determines the resource mapping manner of the data based on the service type of the data to be sent to the terminal device, the size of the resource block occupied by the data, and the distribution status of the interference on the data.

Table 4 shows a correspondence between resource mapping manners and service types of the data, a correspondence between resource mapping manners and sizes of the resource block occupied by the data, and a correspondence between resource mapping manners and distribution statuses of the interference on the data.

TABLE 4

| Interference distribution Size of a resource block | Service type | | |
|---|---|---|---|
| | URLLC | eMBB | mMTC |
| Lateral distribution Large resource block | Resource mapping manner in frequency domain first then time domain/resource mapping manner with interleaved mapping in time and/or frequency domain | Resource mapping manner in time domain first then frequency domain/resource mapping manner with interleaved mapping in time and/or frequency domain | Resource mapping manner with interleaved mapping in time and/or frequency domain |
| Lateral distribution Small resource block | Resource mapping manner in frequency domain first then time domain | Resource mapping manner in frequency domain first then time domain/resource mapping manner with interleaved mapping in time and/or frequency domain | Resource mapping manner in frequency domain first then time domain |
| Longitudinal distribution Large resource block | Resource mapping manner in time domain first then frequency domain/resource mapping manner with interleaved mapping in time and/or frequency domain | Resource mapping manner in time domain first then frequency domain | Resource mapping manner in time domain first then frequency domain |
| Longitudinal distribution Small resource block | Resource mapping manner in frequency domain first then time domain/resource mapping manner with interleaved mapping in time and/or frequency domain | Resource mapping manner in time domain first then frequency domain/resource mapping manner with interleaved mapping in time and/or frequency domain | Resource mapping manner with interleaved mapping in time and/or frequency domain |

It should be noted that, in Table 1 to Table 4 shown above, a large resource block is a resource block whose size is greater than or equal to the first threshold, and a small resource block is a resource block whose size is less than or equal to the second threshold. Longitudinal distribution means that the distribution density of the interference on the data in frequency domain is greater than the distribution density of the interference on the data in time domain, and lateral distribution means that the distribution density of the interference on the data in frequency domain is less than the distribution density of the interference on the data in time domain.

It should be understood that, a method used by the base station to determine the resource mapping manner of the data is not limited to the embodiments described above. Other embodiments derived by a person skilled in the art from the foregoing embodiments of this application also fall within the protection scope of this application.

It should further be understood that, the base station may alternatively determine the resource mapping manner of the data based on another feature of the data to be sent to the terminal device. For example, the base station may alternatively determine the resource mapping manner of the data based on a latency requirement of the data.

In this embodiment of this application, the base station may explicitly or implicitly indicate the determined resource mapping manner to the terminal device. The indication information sent by the base station to the terminal device in step 220 may explicitly indicate the resource mapping manner of the data, or may implicitly indicate the resource mapping manner of the data.

Optionally, in step 220, the base station sends physical layer signaling to the terminal device. The physical layer signaling includes the indication information. The indication information explicitly indicates the resource mapping manner of the data. For example, the indication information may be an identifier or a sequence number of the resource mapping manner. That is, the base station may explicitly indicate the resource mapping manner of the data by using the physical layer signaling.

Optionally, the indication information in step 220 may alternatively implicitly indicate the resource mapping manner of the data. For example, the indication information may be identification information of at least one of the service type of the data, the size of the resource block occupied by the data, and the distribution status of the interference on the data. The terminal device may pre-store a correspondence between the resource mapping manner and at least one of the service type of the data, the size of the resource block occupied by the data, and the distribution status of the interference on the data. The correspondence may be pre-agreed by the base station and the terminal device, or may be stipulated in a protocol. The terminal device may determine the resource mapping manner of the data based on at least one of the service type of the data, the size of the resource block occupied by the data, and the distribution status of the interference on the data and the pre-stored correspondence. In this embodiment of this application, a process that the terminal device determines the resource mapping manner is similar to a process that the base station determines the resource mapping manner, and the foregoing relevant descriptions may be referenced. It should be understood that, an execution order of step 210 and step 220 is not limited in this embodiment. For example, step 210 and step 220 may be concurrently performed, or step 210 may be performed before or after step 220.

Optionally, the resource mapping manner has a correspondence with a scrambling code used by physical layer signaling. The correspondence may be pre-agreed by the base station and the terminal device, or may be stipulated in a protocol. Correspondingly, after the base station determines the resource mapping manner in step 210, the base station sends the physical layer signaling to the terminal device in step 220, and the scrambling code used by the physical layer signaling indicates the resource mapping manner. In step 230, the determining, by the terminal device, the resource mapping manner based on the indication information includes: determining, by the terminal device, the resource mapping manner based on the scrambling code used by the physical layer signaling. That is, the base station may implicitly indicate the resource mapping manner of the data by using the scrambling code used by the physical layer signaling. In this way, the terminal device can determine the resource mapping manner based on the scrambling code and the pre-stored correspondence. It should be understood that, before sending the physical layer signaling to the terminal device, the base station may further determine the scrambling code corresponding to the resource mapping manner, and scramble the physical layer signaling by using the scrambling code.

Optionally, the resource mapping manner has a correspondence with a time-frequency resource used to transmit the data. The correspondence may be pre-agreed by the base station and the terminal device, or may be stipulated in a protocol. Correspondingly, after the base station determines the resource mapping manner in step 210, the base station sends, to the terminal device, indication information of the time-frequency resource used to transmit the data in step 220, and the time-frequency resource indicates the resource mapping manner. In step 230, the determining, by the terminal device, the resource mapping manner based on the indication information includes: determining, by the terminal device based on the indication information of the time-frequency resource, the time-frequency resource used to transmit the data, and determining the resource mapping manner based on the time-frequency resource. That is, the indication information sent by the base station to the terminal device in step 220 is the indication information of the time-frequency resource, and the base station may implicitly indicate the resource mapping manner of the data by using the time-frequency resource used to transmit the data. In this way, the terminal device can determine the resource mapping manner based on the time-frequency resource used to transmit the data and the pre-stored correspondence. It should be understood that, before sending the indication information of the time-frequency resource to the terminal device, the base station may further determine the time-frequency resource that is used to transmit the data and that corresponds to the resource mapping manner, and generate the indication information of the time-frequency resource.

According to this embodiment of this application, the resource mapping manner of the data can be flexibly configured, thereby dispersing the interference and improving the rate of correct decoding.

It should be noted that, sequence numbers of the foregoing processes do not mean execution orders in the embodiments of this application. The execution orders of the processes should be determined based on functions and internal logic of the processes, and should not be construed as any limitation on the implementation processes of the embodiments of this application.

The following describes the base station and the terminal device according to the embodiments of this application with reference to FIG. 5 to FIG. 8.

Figure 5:
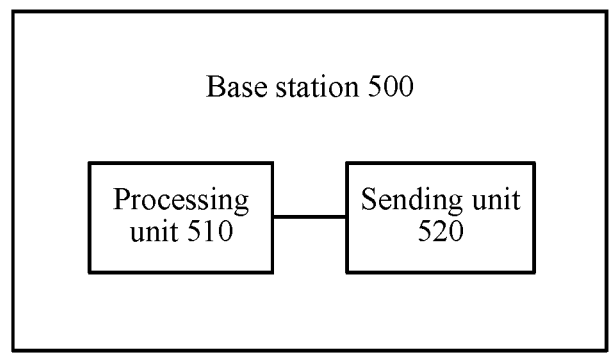
FIG. 5 is a schematic structural diagram of a base station according to an embodiment of this application.

FIG. 5 is a schematic structural diagram of a base station 500 according to an embodiment of this application. As shown in FIG. 5, the base station 500 may include a processing unit 510 and a sending unit 520.

The processing unit 510 is configured to determine, by the base station, a resource mapping manner of data to be sent to a terminal device. The resource mapping manner is one or more of a resource mapping manner in time domain first then frequency domain, a resource mapping manner in frequency domain first then time domain, and a resource mapping manner with interleaved mapping in time and/or frequency domain.

The sending unit 520 is configured to send indication information to the terminal device. The indication information indicates the resource mapping manner.

According to this embodiment of this application, the base station can flexibly configure the resource mapping manner of the data, thereby dispersing interference and improving a rate of correct decoding.

Optionally, the processing unit 510 is specifically configured to determine the resource mapping manner of the data based on at least one of a service type of the data, a size of a resource block occupied by the data, and a distribution status of interference on the data.

Optionally, the processing unit 510 is specifically configured to:

determine that the resource mapping manner is a resource mapping manner in frequency domain first then time domain when the data belongs to an ultra-reliable and low latency communications URLLC-type service;

determine that the resource mapping manner is a resource mapping manner in time domain first then frequency domain or a resource mapping manner with interleaved mapping in time and/or frequency domain when the data belongs to an enhanced mobile broadband eMBB-type service; or determine that the resource mapping manner is a resource mapping manner in frequency domain first then time domain, a resource mapping manner in time domain first then frequency domain, or a resource mapping manner with interleaved mapping in time and/or frequency domain when the data belongs to a massive machine type communications mMTC-type service.

Optionally, the processing unit 510 is specifically configured to:

determine that the resource mapping manner is a resource mapping manner in time domain first then frequency domain or a resource mapping manner with interleaved mapping in time and/or frequency domain if the size of the resource block occupied by the data is greater than or equal to a specified first threshold; or determine that the resource mapping manner is a resource mapping manner in frequency domain first then time domain if the size of the resource block occupied by the data is less than or equal to a specified second threshold.

Optionally, the processing unit 510 is specifically configured to:

determine that the resource mapping manner is a resource mapping manner in time domain first then frequency domain or a resource mapping manner with interleaved mapping in time and/or frequency domain if a distribution density of the interference on the data in frequency domain is greater than a distribution density of the interference on the data in time domain; or determine that the resource mapping manner is a resource mapping manner in frequency domain first then time domain if a distribution density of the interference on the data in frequency domain is less than a distribution density of the interference on the data in time domain.

Optionally, the sending unit 520 is specifically configured to send physical layer signaling to the terminal device. The physical layer signaling includes the indication information.

Optionally, the resource mapping manner has a correspondence with a scrambling code used by physical layer signaling. Correspondingly, the sending unit 520 is specifically configured to send the physical layer signaling to the terminal device. The scrambling code used by the physical layer signaling indicates the resource mapping manner.

Optionally, the resource mapping manner has a correspondence with a time-frequency resource used to transmit the data. Correspondingly, the sending unit is specifically configured to send indication information of the time-frequency resource to the terminal device. The time-frequency resource indicates the resource mapping manner.

It should be understood that, the base station 500 according to this embodiment of this application may correspond to the base station in the communication method according to the embodiments of this application, and the foregoing and other operations and/or functions of the units in the base station 500 are respectively for implementing corresponding procedures of the method 200 shown in FIG. 2. For brevity, details are not described herein again.

It should be noted that the processing unit 510 may be implemented by a processor, and the sending unit 520 may be implemented by a transmitter.

Figure 6:
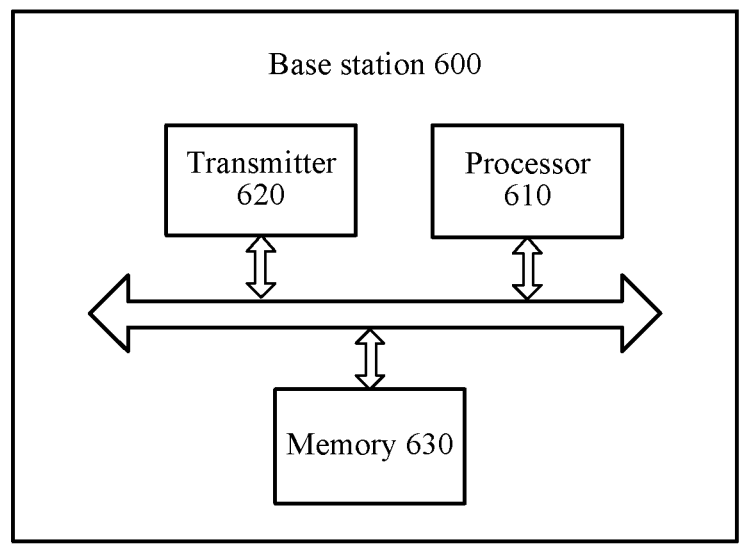
FIG. 6 is a schematic structural diagram of a base station according to another embodiment of this application.

FIG. 6 is a schematic structural diagram of a base station 600 according to another embodiment of this application. As shown in FIG. 6, the base station 600 includes: a processor 610, a transmitter 620, and a memory 630. The processor 610, the transmitter 620, and the memory 630 communicate with each other via an internal connection path, to transfer a control signal and/or a data signal. The memory 620 is configured to store an instruction. The processor 610 is configured to execute the instruction stored in the memory 620.

Specifically, the processor 610 is configured to implement the functions of the processing unit 510 of the base station 500 in FIG. 5, and the transmitter 620 is configured to implement the functions of the sending unit 520 of the base station 500 in FIG. 5. For brevity, details are not described herein again.

It should be understood that, the base station 600 according to this embodiment of this application may correspond to the base station in the communication method according to the embodiments of this application and the base station 500 according to the embodiments of this application, and the foregoing and other operations and/or functions of the units in the base station 600 are respectively for implementing corresponding procedures of the method 200 shown in FIG. 2. For brevity, details are not described herein again.

Figure 7:
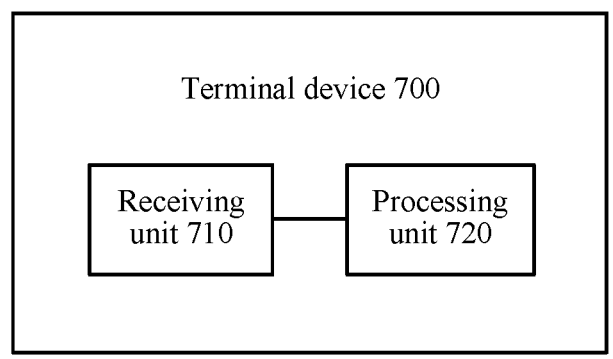
FIG. 7 is a schematic structural diagram of a terminal device according to an embodiment of this application.

FIG. 7 is a schematic structural diagram of a terminal device 700 according to an embodiment of this application. As shown in FIG. 7, the terminal device 700 includes a receiving unit 710 and a processing unit 720.

The receiving unit 710 is configured to receive indication information from a base station. The indication information indicates a resource mapping manner of data to be sent by the base station, and the resource mapping manner is one or more of a resource mapping manner in time domain first then frequency domain, a resource mapping manner in frequency domain first then time domain, and a resource mapping manner with interleaved mapping in time and/or frequency domain.

The processing unit 720 is configured to determine the resource mapping manner based on the indication information received by the receiving unit.

The receiving unit 710 is further configured to receive the data based on the resource mapping manner determined by the processing unit 720.

According to this embodiment of this application, the resource mapping manner of the data can be flexibly configured, thereby dispersing interference and improving a rate of correct decoding.

Optionally, the resource mapping manner is determined based on at least one of a service type of the data, a size of a resource block occupied by the data, and a distribution status of interference on the data.

Optionally, when the data is belongs to ultra-reliable and low latency communications URLLC-type service, the processing unit 720 is specifically configured to determine that the resource mapping manner is a resource mapping manner in frequency domain first then time domain based on the indication information; or when the data is belongs to enhanced mobile broadband eMBB-type service, the processing unit 720 is specifically configured to determine that the resource mapping manner is a resource mapping manner in time domain first then frequency domain or a resource mapping manner with interleaved mapping in time and/or frequency domain based on the indication information; or when the data belongs to a massive machine type communications mMTC-type service, the processing unit 720 is specifically configured to determine that the resource mapping manner is a resource mapping manner in time domain first then frequency domain, a resource mapping manner in frequency domain first then time domain, or a resource mapping manner with interleaved mapping in time and/or frequency domain based on the indication information.

Optionally, if the size of the resource block occupied by the data is greater than or equal to a specified first threshold, the processing unit 720 is specifically configured to determine that the resource mapping manner is a resource mapping manner in time domain first then frequency domain or a resource mapping manner with interleaved mapping in time and/or frequency domain based on the indication information; or if the size of the resource block occupied by the data is less than or equal to a specified second threshold, the processing unit 720 is specifically configured to determine that the resource mapping manner is a resource mapping manner in frequency domain first then time domain based on the indication information.

Optionally, if a distribution density of the interference on the data in frequency domain is greater than a distribution density of the interference on the data in time domain, the processing unit 720 is specifically configured to determine that the resource mapping manner is a resource mapping manner in time domain first then frequency domain or a resource mapping manner with interleaved mapping in time and/or frequency domain based on the indication information; or if a distribution density of the interference on the data in frequency domain is less than a distribution density of the interference on the data in time domain, the processing unit 720 is specifically configured to determine that the resource mapping manner is a resource mapping manner in frequency domain first then time domain based on the indication information.

Optionally, the receiving unit 710 is specifically configured to receive physical layer signaling from the base station. The physical layer signaling includes the indication information.

Optionally, the resource mapping manner has a correspondence with a scrambling code used by physical layer signaling. Correspondingly, the receiving unit 710 is specifically configured to receive the physical layer signaling from the base station. The scrambling code used by the physical layer signaling indicates the resource mapping manner.

Optionally, the resource mapping manner has a correspondence with a time-frequency resource used to transmit the data. Correspondingly, the receiving unit 710 is specifically configured to receive indication information of the time-frequency resource from the base station. The time-frequency resource indicates the resource mapping manner.

It should be understood that, the terminal device 700 according to this embodiment of this application may correspond to the terminal device in the communication method according to the embodiments of this application, and the foregoing and other operations and/or functions of the units in the terminal device 700 are respectively for implementing corresponding procedures of the method 200 shown in FIG. 2. For brevity, details are not described herein again.

It should be noted that, the receiving unit 710 may be implemented by a receiver, and the processing unit 720 may be implemented by a processor.

Figure 8:
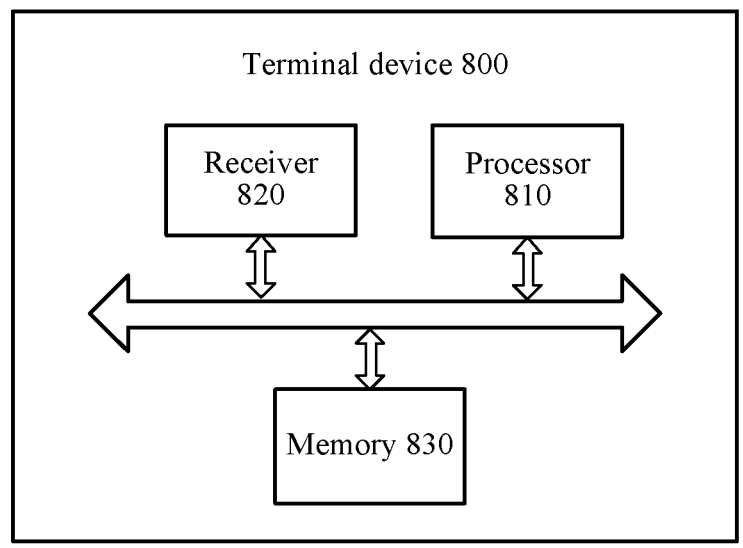
FIG. 8 is a schematic structural diagram of a terminal device according to another embodiment of this application.

FIG. 8 is a schematic structural diagram of a terminal device 800 according to another embodiment of this application. As shown in FIG. 8, the terminal device 800 includes: a processor 810, a receiver 820, and a memory 830. The processor 810, the receiver 820, and the memory 830 communicate with each other via an internal connection path, to transfer a control signal and/or a data signal. The memory 830 is configured to store an instruction. The processor 810 is configured to execute the instruction stored in the memory 830.

Specifically, the processor 810 is configured to implement the functions of the processing unit 720 of the terminal device 700 in FIG. 7, and the receiver 820 is configured to implement the functions of the receiving unit 710 of the terminal device 700 in FIG. 7. For brevity, details are not described herein again.

It should be understood that, the terminal device 800 according to this embodiment of this application may correspond to the terminal device in the communication method according to the embodiments of this application and the terminal device 700 according to the embodiments of this application, and the foregoing and other operations and/or functions of the units in the terminal device 800 are respectively for implementing corresponding procedures of the method 200 shown in FIG. 2. For brevity, details are not described herein again.

The memory in the foregoing embodiments may include a volatile memory, for example, a random-access memory (RAM), or the memory may include a non-volatile memory, for example, a flash memory, a hard disk (HDD), or a solid-state drive (SSD). Alternatively, the memory may include a combination of the foregoing types of memories.

The processor in the foregoing embodiments may be a central processing unit (CPU), a network processor (NP), or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the current system, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for communication, comprising:
   determining, by a base station, a first resource mapping manner of data to be sent to a terminal device, wherein the first resource mapping manner is one or more of a resource mapping manner in time domain first then frequency domain, a resource mapping manner in frequency domain first then time domain, and a resource mapping manner with interleaved mapping in at least one of time domain or frequency domain; and
   sending, by the base station, indication information to the terminal device, wherein the indication information indicates the resource mapping manner,
   wherein the first resource mapping manner is determined based on at least one of a service type of the data, a size of a resource block occupied by the data, or a distribution status of interference on the data, and
   when a distribution density of the interference on the data in frequency domain is greater than a distribution density of the interference on the data in time domain, the determining, by the base station, the first resource mapping manner based on the indication information comprises: determining, by the base station, that the first resource mapping manner is a resource mapping manner in time domain first then frequency domain or a resource mapping manner with interleaved mapping in at least one of time or frequency domain based on the indication information; or
   when a distribution density of the interference on the data in frequency domain is less than a distribution density of the interference on the data in time domain, the determining, by the base station, the first resource mapping manner based on the indication information comprises: determining, by the base station, that the first resource mapping manner is a resource mapping manner in frequency domain first then time domain based on the indication information.

2. The method according to claim 1, wherein the sending, by the base station, indication information to the terminal device comprises:
   sending, by the base station, physical layer signaling to the terminal device, wherein the physical layer signaling comprises the indication information.

3. A method for communication, comprising:
   receiving, by a terminal device, indication information from a base station, wherein the indication information indicates a first resource mapping manner of data to be sent by the base station, and the resource mapping manner is one or more of a resource mapping manner in time domain first then frequency domain, a resource mapping manner in frequency domain first then time domain, and a resource mapping manner with interleaved mapping in at least one of time domain or frequency domain;
   determining, by the terminal device, the resource mapping manner based on the indication information; and
   receiving, by the terminal device, the data based on the resource mapping manner,
   wherein the first resource mapping manner is determined based on at least one of a service type of the data, a size of a resource block occupied by the data, or a distribution status of interference on the data, and
   when a distribution density of the interference on the data in frequency domain is greater than a distribution density of the interference on the data in time domain, the determining, by the terminal device, the first resource mapping manner based on the indication information comprises: determining, by the terminal device, that the first resource mapping manner is a resource mapping manner in time domain first then frequency domain or a resource mapping manner with interleaved mapping in at least one of time or frequency domain based on the indication information; or
   when a distribution density of the interference on the data in frequency domain is less than a distribution density of the interference on the data in time domain, the determining, by the terminal device, the first resource mapping manner based on the indication information comprises: determining, by the terminal device, that the first resource mapping manner is a resource mapping manner in frequency domain first then time domain based on the indication information.

4. The method according to claim 3, wherein
   when the data belongs to an ultra-reliable and low latency communications (URLLC)-type service, the determining, by the terminal device, the first resource mapping manner based on the indication information comprises: determining, by the terminal device, that the first resource mapping manner is a resource mapping manner in frequency domain first then time domain based on the indication information; or
   when the data belongs to an enhanced mobile broadband (eMBB)-type service, the determining, by the terminal device, the first resource mapping manner based on the indication information comprises: determining, by the terminal device, that the first resource mapping manner is a resource mapping manner in time domain first then frequency domain or a resource mapping manner with interleaved mapping in at least one of time or frequency domain based on the indication information; or when the data belongs to a massive machine type communications (mMTC-type) service, the determining, by the terminal device, the first resource mapping manner based on the indication information comprises: determining, by the terminal device, that the first resource mapping manner is a resource mapping manner in time domain first then frequency domain, a resource mapping manner in frequency domain first then time domain, or a resource mapping manner with interleaved mapping in at least one of time or frequency domain based on the indication information.

5. The method according to claim 3, wherein when the size of the resource block occupied by the data is greater than or equal to a specified first threshold, the determining, by the terminal device, the first resource mapping manner based on the indication information comprises: determining, by the terminal device, that the first resource mapping manner is a resource mapping manner in time domain first then frequency domain or a resource mapping manner with interleaved mapping in at least one of time or frequency domain based on the indication information; or when the size of the resource block occupied by the data is less than or equal to a specified second threshold, the determining, by the terminal device, the first resource mapping manner based on the indication information comprises: determining, by the terminal device, that the first resource mapping manner is a resource mapping manner in frequency domain first then time domain based on the indication information.

6. The method according to claim 3, wherein the receiving, by a terminal device, indication information from a base station comprises:

receiving, by the terminal device, physical layer signaling from the base station, wherein the physical layer signaling comprises the indication information.

7. The method according to claim 3, wherein the receiving, by a terminal device, indication information from a base station comprises:

receiving, by the terminal device, the physical layer signaling from the base station, wherein the scrambling code used by the physical layer signaling indicates the first resource mapping manner.

8. The method according to claim 3, wherein the receiving, by a terminal device, indication information from a base station comprises:

receiving, by the terminal device, indication information of the time-frequency resource from the base station, wherein the time-frequency resource indicates the first resource mapping manner.

9. A terminal device, comprising:

a receiver, in coordination with at least one processor, configured to receive indication information from a base station, wherein the indication information indicates a first resource mapping manner of data to be sent by the base station, and the first resource mapping manner is one or more of a resource mapping manner in time domain first then frequency domain, a resource mapping manner in frequency domain first then time domain, and a resource mapping manner with interleaved mapping in at least one of time or frequency domain; and the at least one processor, configured to determine the first resource mapping manner based on the indication information received by the receiver, wherein the receiver is further configured to receive the data based on the first resource mapping manner determined by the at least one processor, wherein the first resource mapping manner is determined based on at least one of a service type of the data, a size of a resource block occupied by the data, or a distribution status of interference on the data, and when a distribution density of the interference on the data in frequency domain is greater than a distribution density of the interference on the data in time domain, the at least one processor is configured to determine that the first resource mapping manner is a resource mapping manner in time domain first then frequency domain or a resource mapping manner with interleaved mapping in at least one of time or frequency domain based on the indication information; or when a distribution density of the interference on the data in frequency domain is less than a distribution density of the interference on the data in time domain, the at least one processor is configured to determine that the first resource mapping manner is a resource mapping manner in frequency domain first then time domain based on the indication information.

10. The terminal device according to claim 9, wherein when the data belongs to an ultra-reliable and low latency communications (URLLC)-type service, the at least one processor is configured to determine that the first resource mapping manner is a resource mapping manner in frequency domain first then time domain based on the indication information; or when the data belongs to an enhanced mobile broadband (eMBB)-type service, the at least one processor is configured to determine that the first resource mapping manner is a resource mapping manner in time domain first then frequency domain or a resource mapping manner with interleaved mapping in at least one of time or frequency domain based on the indication information; or when the data belongs to a massive machine type communications (mMTC-type) service, the at least one processor is configured to determine that the first resource mapping manner is a resource mapping manner in time domain first then frequency domain, a resource mapping manner in frequency domain first then time domain, or a resource mapping manner with interleaved mapping in at least one of time or frequency domain based on the indication information.

11. The terminal device according to claim 9, wherein when the size of the resource block occupied by the data is greater than or equal to a specified first threshold, the at least one processor is configured to determine that the first resource mapping manner is a resource mapping manner in time domain first then frequency domain or a resource mapping manner with interleaved mapping in at least one of time or frequency domain based on the indication information; or when the size of the resource block occupied by the data is less than or equal to a specified second threshold, the at least one processor is configured to determine that the first resource mapping manner is a resource mapping manner in frequency domain first then time domain based on the indication information.

12. The terminal device according to claim 9, wherein the receiver is configured to receive physical layer signaling from the base station, wherein the physical layer signaling comprises the indication information.

13. The terminal device according to claim 9, wherein:
the receiver is configured to receive the physical layer signaling from the base station, wherein the scrambling code used by the physical layer signaling indicates the first resource mapping manner.

14. The terminal device according to claim 9, wherein:
the receiver is configured to receive indication information of the time-frequency resource from the base station, wherein the time-frequency resource indicates the first resource mapping manner.

* * * * *